United States Patent Office 3,442,952
Patented May 6, 1969

3,442,952
2 - CHLOROTETRAFLUORO - 3 - OXY - 2 - CYCLO-
PENTENE-1-ONES AND PROCESS FOR PREPAR-
ING THEM
Richard F. Sweeney, Randolph Township, Dover, and William J. Cunningham, Rockaway, N.J., assignors to Allied Chemical Corporation, New York, N.Y., a corporation of New York
No Drawing. Filed Apr. 30, 1965, Ser. No. 452,384
Int. Cl. C07c 45/00
U.S. Cl. 260—586                                    4 Claims

ABSTRACT OF THE DISCLOSURE 2-chlorotetrafluoro-3-oxy-2-cyclopenten-1-ones are prepared by treating 2,3-dichloroperfluoro-2-cyclopenten-1-one with alkanols of from one to seven carbon atoms.

---

This invention relates to new 2-chlorotetrafluoro-3-oxy-2-cyclopentene-1-ones of the formula

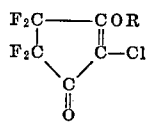

wherein R represents a member selected from the group consisting of hydrogen, alkyl groups of 1 to 7 carbon atoms and hydroxyalkyl groups of 1 to 7 carbon atoms. The compound wherein R represents hydrogen is tautomeric and may exist in both the keto and enol forms shown below:

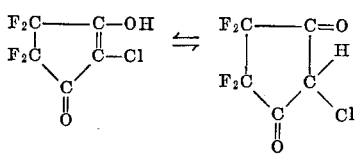

The new compounds of our invention are produced by reacting 2,3-dichlorotetrafluoro-2-cyclopentene-1-one with water or a lower aliphatic alcohol according to the equation shown below:

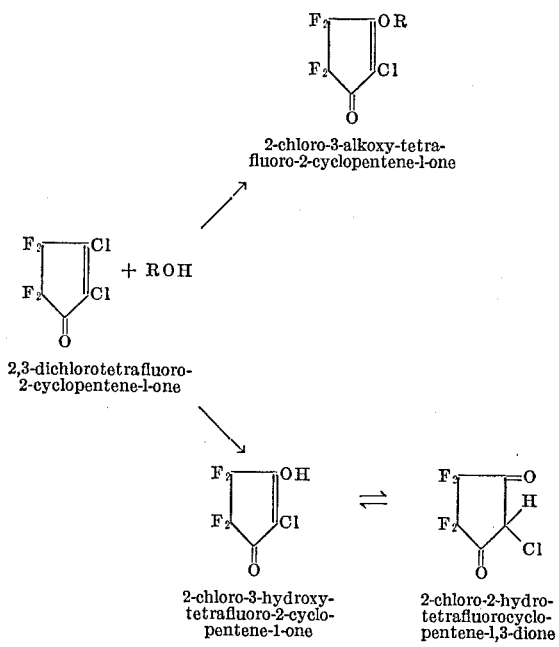

Whenever the above tautomeric compounds are referred to herein as 2-chloro-3-hydroxy-2-cyclopentene-1-one, it will be understood that both of the above forms are intended to be included.

When the 2,3-dichlorotetrafluoro-2-cyclopentene-1-one is reacted with water, only the tautomeric 2-chloro-3-hydroxy-2-cyclopentene-1-one is produced as the sole reaction product. When the 2,3-dichlorotetrafluoro-2-cyclopentene-1-one is reacted with an alcohol, a mixture is produced of the tautomeric 2-chloro-3-hydroxycyclopentene-1-one and the alkyl ether, 2-chloro-3-alkoxytetrafluorocyclopentene-1-one. Both products are produced in the same reaction and are readily separated from each other by distillation because of their diversity in boiling points.

It is believed that the reaction with the alcohol proceeds stepwise through the 3-alkoxy compound to the hydroxy compound, but we have found that the intermediate alkyl ether product is sufficiently stable so that it can readily be isolated and recovered from the reaction mixture. Moreover, by restricting the proportion of alcohol to one mole or less of the ketone starting material, the final hydrolysis step can be substantially suppressed or inhibited, thus providing a major proportion of the reaction products in the form of the ether. For producing high yields of the hydroxy compound, on the other hand, we prefer to use a molecular excess of alcohol, for example, between about 2 moles and about 10 moles of alcohol per mole of halocyclopentenone.

The 2,3-dichlorotetrafluoro-2-cyclopentene-1-one used as starting material in our process can be prepared by reacting the corresponding 1,2-dichloroperfluorocyclic alkene with sulfur trioxide in the presence of a catalyst such as antimony pentachloride as described in copending U.S. application Ser. No. 373,110 of Benjamin Veldhuis and R. J. Du Bois, filed June 5, 1964, now Patent No. 3,310,584.

The new tautomeric hydroxy compound of our invention is a solid at normal atmospheric temperatures, the ether is a liquid. Both are solvents, when liquid, for homopolymers of trifluoromonochloroethylene and copolymers thereof with other monomers such as vinylidene fluoride and tetrafluoroethylene, wherein the trifluoromonochloroethylene constitutes at least a major portion of the polymer. We have found that excellent adhesives for joining films of such trifluoromonochloroethylene polymers and copolymers can be prepared by dissolving a small amount, for example, between 1 part and 10 parts of polymer per 100 parts of any one of our new compounds as solvent, and placing the adhesive thus produced between the surfaces of the films to be sealed and heating the films in contact with the polymer solution at temperatures between about 350° F. and 400° F. under pressures between about 20 p.s.i.g. and 40 p.s.i.g. for a period of at least 3 seconds. Under such conditions, excellent adhesion of the films is obtained, whereas with no adhesive, such films cannot be sealed at these temperatures and must be heated to temperatures in excess of about 425° C. to produce even a moderate degree of adhesion.

In carrying out the preparation of the new compounds of our invention, the liquid 2,3-dichlorotetrafluoro-2-cyclo-pentene-1-one (B.P. 127° C.) is mixed with amounts of water or alcohol from less than stoichiometric to a slight excess, depending on the sought-for product, quantities between about 0.25 mole and about 3 moles of water or alcohol per mole of ketone being suitable. The resulting mixture is preferably agitated, at least until solution is complete. The reactants can be mixed at normal atmospheric temperatures or below, if desired. The reaction will initiate at normal room temperature (ca. 20–25° C.) and is exothermic. The temperature of the mixture is preferably maintained at the reflux temperature of the starting hydroxy compound, i.e., between about 80° C.

and about 200° C. After completion of the reaction, usually in a period between about 1 hour and about 48 hours, excess alcohol is removed as by distillation. The resulting products are readily separated as by distillation.

The alcohols used in these reactions can be absolute, or they may contain water. However, if aqueous alcohols are used, it may be desirable to add an azeotroping solvent such as benzene to the reaction mixture prior to distillation to aid in the removal of water from the mixture. Suitable alcohols include methyl alcohol, ethyl alcohol, n-propyl alcohol, isopropyl alcohol, n-butanol, isobutanol, the pentanols, the hexanols, the heptanols, ethylene glycol diethylene glycol, glycerol and the like.

The following specific examples further illustrate our invention. Parts are by weight except as otherwise noted.

EXAMPLE 1

Into a 100 ml. three-necked flask fitted with stirrer, condenser, thermometer and dropping funnel and connected to a Dry-Ice acetone trap were placed 25 grams (0.11 mole) 2,3-dichlorotetrafluoro-2-cyclopentene-1-one and 6.6 grams (0.27 mole) water. This mixture was heated to reflux for 17 hours. At this time there was only one phase in the reaction flask. About 25 ml. concentrated $H_2SO_4$ was slowly added to dehydrate the mixture and throw out the water-soluble product. When the mixture cooled, a white crystalline solid precipitated out. This crystalline material was recrystallized from benzene, a melting point of 94–97° C. was obtained. Its boiling point was 102–104° C./4 mm. Infrared spectrographic analysis of the resulting 2-chloro-3-hydroxytetrafluoro - 2-cyclopentene-1-one and showed a carbonyl absorption band at 5.76μ, a hydroxyl band at 2.8μ, and a C=C band at 6.19μ, indicating the following structure:

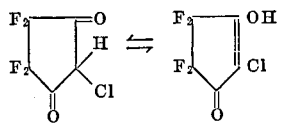

The N.M.R. absorption spectrum was compatible with this assigned structure.

Analysis.—Calcd. for $C_5F_4ClHO_2$: C, 29.41 percent; Cl, 17.40 percent. Found: C, 29.9 percent; Cl, 17.2 percent.

EXAMPLE 2

Into a 500 ml. three-necked flask fitted with stirrer, thermometer, droping funnel and reflux condenser connected to a Dry-Ice acetone trap were placed 200 grams (0.91 mole) of 2,3-dichlorotetrafluoro-2-cyclopentene-1-one B.P. 127° C. One hundred twenty-four grams (2.70 moles) of absolute ethanol were slowly added to the reaction mixture over a 20 minute period, i.e., a mole ratio of 3 moles of alcohol per mole of ketone. The reaction temperature rose from 25 to 60° C. The mixture was heated to reflux temperature for about 48 hours. There was recovered 51 grams of low boiling material in the Dry-Ice acetone trap and 246 grams of crude product in the reaction vessel. The low boiling mixture was identified as a mixture of ethyl chloride and diethyl ether. The 246 grams of crude product was distilled on a small spinning band column. There was recovered a forefraction (18 grams, 0.24 mole) of diethyl ether, B.P. 33–36° C., an intermediate fraction (41 grams, 0.89 mole) of ethanol, B.P. 79–89° C., another intermediate fraction (19 grams, 0.082 mole) of 2-chloro-3-ethoxytetrofluoro-2-cyclopentene-1-one, B.P. 77–79° C./4 mm. and a final fraction (168 grams, 0.82 mole) of 2-chloro-3-hydroxytetrafluoro-2-cyclopentene-1-one, B.P. 102–104° C./4 mm. Infrared spectrographic analysis of the 2-chloro-3-ethoxytetrafluoro - 2-cyclopentene-1-one showed a carbonyl absorption band at 5.68μ, a C=C absorption band at 6.19μ, and an ethyl hydrogen absorption band at 3.32μ, indicating the following structure:

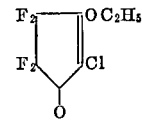

The N.M.R. spectrum analysis agreed with this assigned structure.

Analysis.—Calcd. for $C_7F_4ClH_5O_2$: Cl, 15.30 percent; H, 2.15 percent. Found: Cl. 15.6 percent; H, 2.05 percent.

Infrared spectrographic analysis of the 2-chloro-3-hydroxytetrafluoro-2-pentene-1-one was identical to the compound obtained in Example 1.

EXAMPLE 3

Into a 50 ml. flask fitted with a stirrer, thermometer and reflux condenser were placed 16 grams (0.078 mole) of 2-chloro-3-hydroxytetrafluoro - 2-cyclopentene-1-one and 4 grams (0.087 mole) absolute ethanol. The mixture was heated to 110° C. for 24 hours. The mixture was distilled on a small spinning band column. There was recovered a forefraction (2 grams, 0.04 mole) of ethanol, an intermediate fraction of 2 grams, and unreacted starting material (16 grams, 0.078 mole) 2-chloro-3-hydroxytetrafluoro-2-cyclopentene-1-one thus indicating that this ketone does not cleave or further react with alcohols to form keto esters such as

EXAMPLE 4

Into a 50 ml. flask fitted with a stirrer, thermometer and reflux condenser were placed 5 grams (0.02 mole) of 2 - chloro-3-ethoxytetrafluoro-2-cyclopentene-1-one and 1 gram (0.06 mole) of water. The two immiscible materials were refluxed for 24 hours. When the mixture cooled, there was only one phase present in the reaction flask. About 2 ml. of $H_2SO_4$ was added to the mixture. A white precipitate which was recrystallized from benzene was obtained. Infrared spectrographic analysis showed this compound to be 2-chloro-3-hydroxytetrafluoro-2-cyclopentene-1-one, thus indicating that the 2-chloro-3-ethoxytetrafluoro-2-cyclopentene-1-one is an intermediate and can be converted to 2 - chloro - 3-hydroxytetrafluoro-2-cyclopentene-1-one by further reaction with ROH wherein R represents hydrogen or alkyl groups.

EXAMPLE 5

A mixture of 44.6 grams (0.200 mole) of 2,3-dichlorotetrafluoro-2-cyclopentenone and 6.21 grams (0.100 mole) of ethylene glycol were heated to 135° C. for 7 hours. The product mixture was distilled under vacuum. A small quantity of white crystalline solid distilled over at 98° C./1 mm. The solid had a melting point of 93° C. and had an infrared absorption spectra identical with the 2-chloro-3-hydroxytetrafluoro-2-cyclopentene-1-one prepared in Example 1.

EXAMPLE 6

A mixture of 100 grams (0.448 mole) of 2,3-dichlorotetrafluoro-2-cyclopentenone and 22 grams (0.69 mole) of methanol (a mole ratio of cyclopentenone to alcohol of 1:1.5) were heated to reflux temperature for 4 hours. The product mixture was distilled through a 30-inch vacuum jacketed column. The major product, 31 grams (0.14 mole) of 2-chloro-3-methoxytetrafluoro-2-cyclopentene-1-one, representing a yield of about 31 mole percent, had a boiling point of 192–193° C. A pot residue was also obtained.

Infrared spectrographic analysis of the 2-chloro-3-methoxy-2-cyclopentene-1-one showed a carbonyl absorption band at 5.70μ, a C=C absorption band at 6.20μ, and a methyl hydrogen absorption band at 3.49μ, indicating the following structure:

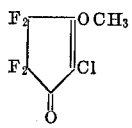

*Analysis.*—Calcd. for $C_6F_4ClH_3O_2$: Cl, 16.25%. Found: Cl, 16.3%.

The pot residue was recrystallized from methylene chloride, yielding 32 grams (0.16 mole) of 2-chloro-3-hydroxytetrafluoro-2-cyclopentene-1-one, a yield of 36 mole percent whose infrared spectrographic analysis was identical to the compound prepared in Example 1.

This example illustrates the effect of a low mole ratio of alcohol to cyclopentenone in producing higher yields of the ether in the final product, than did the 1:3 mole ratio of cyclopentenone to alcohol employed in Example 2, wherein only 9% ether was obtained.

EXAMPLE 7

Using the same apparatus and procedure as that described in Example 6 above, a mixture of 100 grams (0.448 mole) of 2,3-dichlorotetrafluoro-2-cyclopentenone and 15 grams (0.469 mole) of methanol was heated to reflux for about 5 hours. The product mixture was distilled to give 48 grams of material boiling at 192° C. consisting of 2-chloro-3-methoxytetrafluoro-2-cyclopentene-1-one in a yield of 49.5%, and a 48 gram residue. This residue was recrystallized from methylene chloride. The recrystallized solid was acid to litmus. The neutralization equivalent of the material was found to be 207.9 gram/equivalent of base. The calculated molecular weight for $C_5HClF_4O_2$ is 204.5 indicating the material to be 2-chloro-3-hydroxytetrafluoro-2-cyclopentene-1-one; obtained in a yield of about 50.5%.

This example illustrates that the reaction of the dichlorotetrafluoro-2-cyclopentenone and alcohol in a mole ratio of about 1:1 produces about equal yields of the alkyl ether and the hydroxy compound.

EXAMPLE 8

Solutions were made by dissolving one part samples of a copolymer of about 96% trifluoromonochloroethylene and 4% vinylidene fluoride in ten parts of each of 2-chloro-3-hydroxytetrafluoro-2-cyclopentene-1-one, and 2-chloro-3-ethoxytetrafluoro-2-cyclopentene-1-one. A portion of each solution was then spread in a thin film (ca. 0.1 to 0.2 mils in thickness) on a 2-mil thick film of the same type of a copolymer of about 96% trifluoromonochloroethylene and about 4% vinylidene fluoride. The coated films were then folded over onto a coated portion of the film, and the two layers thus formed were sealed on a bar type sealer by subjecting the film to a temperature of 375° F. and 30 p.s.i.g. for three seconds. For comparative purposes an untreated film of the same copolymer was folded and heat sealed under the same conditions. The sealed films were then tested for seal strength by cutting the film into strips having one inch square sealed portions with unsealed flaps at each end. One flap was secured in a clamp, the other flap was subjected to weights applied vertically to determine the weight necessary to rupture the seal or break the copolymer film. Results are shown in the table below:

TABLE.—SEAL STRENGTH OF COATED AND UNCOATED FILM

| Coating | Weight in grams required break | Type rupture |
|---|---|---|
| None | <10 | Seal opened. |
| 10% solutuon of copolymer in 2-chloro-3-hydroxytetrafluoro-2-cyclopentene-1-one. | 1,359 | Film tore. |

It will be noted from the above table that the seal strengths of the laminates made from films which had been coated with a new compound of our invention are tremendously greater than seals made by heat and pressure alone exerted on the uncoated films. In the case of the film sealed with the aid of the 2-chloro-3-hydroxy-2-cyclopentene-1-one, the strength of the seal is greater than that of the polymer film itself, so that on application of weights, the film itself tears before the seal gives way.

While the above describes the preferred embodiments of our invention, it will be understood that departures can be made therefrom within the scope of the specification and claims.

We claim:
1. The process for preparing a mixture of compounds of the formulas
Serial No. 452, 384

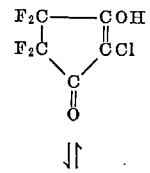

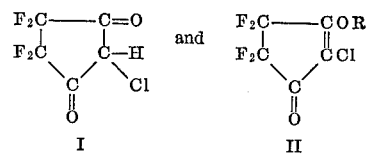

wherein R is a member selected from the group consisting of alkyl groups of 1 to 7 carbon atoms and hydroxy alkyl groups of 1 to 7 carbon atoms, which comprises heating a mixture of 2,3-dichloro-perfluoro-2-cyclopenten-1-one of the formula

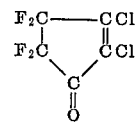

and at least 0.25 mole, per mole of cyclopentenone, of an alcohol of the formula ROH wherein R is as defined above, at temperatures between about 25° C. and about 200° C. for a period of at least about 1 hour and thereafter recovering a 2-chloro-3-oxytetrafluoro-2-cyclopenten-1-one product.

2. The process according to claim 1, wherein the mole ratio of alcohol to cyclopentenone is less than 1, and the reaction product is fractionally distilled to recover separate reaction products.

3. The process according to claim 1 wherein R is an alkyl group of 1 to 7 carbon atoms.

4. The process according to claim 1 wherein the mole ratio of alcohol to cyclopentenone is in excess of 1, and the reaction product is fractionally distilled to recover separate reaction products.

References Cited

UNITED STATES PATENTS

3,,244,749    4/1966    Weil _____ 260—586

FOREIGN PATENTS 1,224,735    9/1966    Germany.

OTHER REFERENCES

McBee et al.: J. Am. Chem. Soc., vol. 84, pp. 3557–3561 (1962).

Raphael et al.: Adv. in Org. Chem., vol. 3, pp. 263–264 (1963).

Weil et al.: J. Org. Chem., vol. 28, pp. 2218, 2219 and 2222 (1963).

LEON ZITVER, *Primary Examiner.*

MATTHEW M. JACOBS, *Assistant Examiner.*

U.S. Cl. X.R.

260—32.8